(12) United States Patent
Shirasaka et al.

(10) Patent No.: US 8,414,452 B2
(45) Date of Patent: Apr. 9, 2013

(54) POWER TRANSMISSION DEVICE

(75) Inventors: Haruki Shirasaka, Anjo (JP); Masahiro Ito, Anjo (JP); Tetsuya Shimizu, Anjo (JP); Kazunori Ishikawa, Toyota (JP); Kazuhiko Kato, Kariya (JP); Kenichi Tsuchida, Hazugun (JP); Nobuo Suzuki, Toyohashi (JP)

(73) Assignee: Aisin AW Co., Ltd., Anjo (JP)

( * ) Notice: Subject to any disclaimer, the term of this patent is extended or adjusted under 35 U.S.C. 154(b) by 734 days.

(21) Appl. No.: 12/656,015

(22) Filed: Jan. 13, 2010

(65) Prior Publication Data

US 2010/0203989 A1 Aug. 12, 2010

(30) Foreign Application Priority Data

Feb. 9, 2009 (JP) .................................. 2009-027494
Jul. 8, 2009 (JP) .................................. 2009-162118

(51) Int. Cl.
*F16H 61/00* (2006.01)
(52) U.S. Cl. ........................................................ 477/45
(58) Field of Classification Search .................. 475/93, 475/104, 108, 115, 116, 208, 210; 477/11, 477/45
See application file for complete search history.

(56) References Cited

U.S. PATENT DOCUMENTS

| | | | |
|---|---|---|---|
| 5,006,093 A * | 4/1991 | Itoh et al. ........................ | 474/28 |
| 5,674,150 A * | 10/1997 | Morishita et al. ................ | 477/39 |
| 6,390,947 B1 * | 5/2002 | Aoki et al. ......................... | 477/3 |
| 6,612,958 B2 | 9/2003 | Imai et al. | |
| 7,163,481 B2 * | 1/2007 | Takagi et al. .................. | 475/101 |
| 8,066,595 B2 * | 11/2011 | Ogata et al. ..................... | 474/28 |
| 8,272,485 B2 * | 9/2012 | Yoshida et al. ................ | 192/3.3 |
| 2003/0083169 A1 * | 5/2003 | Iwata et al. .................... | 475/208 |

FOREIGN PATENT DOCUMENTS

| | | |
|---|---|---|
| JP | A 64-26062 | 1/1989 |
| JP | A 10-324177 | 12/1998 |
| JP | A 11-132321 | 5/1999 |
| JP | A 2000-45807 | 2/2000 |
| JP | A 2002-181175 | 6/2002 |
| JP | A 2008-295277 | 12/2008 |

OTHER PUBLICATIONS

International Search Report mailed Mar. 16, 2010 for PCT/JP2010/050411.

* cited by examiner

*Primary Examiner* — David D Le
*Assistant Examiner* — David J Hlavka
(74) *Attorney, Agent, or Firm* — Oliff & Berridge, PLC (57) ABSTRACT

A power transmission device is installed in a vehicle and connected to a power generation source that is capable of outputting power for driving. The power transmission device includes a belt-type continuously variable transmission; a working fluid accumulation portion; a friction engagement element; a first pump; a pressure regulating valve; a friction engagement element pressure regulating valve; a second pump; and a switching valve.

8 Claims, 5 Drawing Sheets

POWER TRANSMISSION DEVICE

INCORPORATION BY REFERENCE

The disclosure of Japanese Patent Application No. 2009-162118 filed on Jul. 8, 2009 and Japanese Patent Application No. 2009-027494 filed on Feb. 9, 2009 including the specification, drawings and abstract is incorporated herein by reference in its entirety.

BACKGROUND

The present invention relates to a power transmission device, particularly a power transmission device that includes a belt-type continuously variable transmission.

Conventionally, a type of power transmission device has been known that includes a belt-type continuously variable transmission that has a primary pulley that is provided on a primary shaft, a secondary pulley that is provided on a secondary shaft, and a belt that is passed around both of the pulleys (for example, refer to Japanese Patent Application Publication No. JP-A-2002-181175). In the power transmission device, a primary hydraulic actuator (a hydraulic cylinder) is used to vary a groove width of the primary pulley, and a secondary hydraulic actuator (a hydraulic cylinder) is used to vary a groove width of the secondary pulley, such that power that is transmitted from an engine to the primary shaft through a forward/reverse switching mechanism can be continuously varied and output to the secondary pulley. The power transmission device also has a manual valve that is capable of selectively supplying to a forward clutch and a reverse clutch of the forward/reverse switching mechanism a working fluid that is supplied from a clutch modulator valve at a pressure that is roughly equal to a line pressure. That is, when a D range for driving forward is selected as a shift range, the working fluid is supplied from the clutch modulator valve, through the manual valve, to a hydraulic servo of the forward clutch, and when an R range for driving in reverse is selected as the shift range, the working fluid is supplied from the clutch modulator valve, through the manual valve, to a hydraulic servo of the reverse clutch.

SUMMARY

In a vehicle in which the power transmission device that includes the belt-type continuously variable transmission described above is installed, fuel economy can be improved by implementing what is called an idle stop control that stops the engine automatically when the vehicle stops and that starts the engine automatically when the vehicle starts moving again. However, when the operation of the engine is stopped by the idle stop control, pumping of the working fluid by a mechanical pump that is driven by the engine also stops, making it difficult to maintain a coupled state or a nearly coupled state of the forward clutch and the reverse clutch of the forward/reverse switching mechanism. Therefore, if no countermeasures of any sort are implemented, when the engine is restarted after its operation has been stopped by the idle stop control, it may be impossible for power from the engine to be output immediately to a drive wheel, making it impossible to ensure good driving performance when the vehicle starts moving forward again.

Accordingly, in a power transmission device that is provided with a belt-type continuously variable transmission that is connected to a power generation source, the present invention more appropriately maintains a state of connection between the power generation source and the belt-type continuously variable transmission from the time when the operation of the power generation source is stopped until the operation is restarted.

The power transmission device according to the present invention employs means, described below, in order to address the problem that is described above.

The power transmission device according to the present invention is a power transmission device that is installed in a vehicle and that is connected to a power generation source that is capable of outputting power for driving. The power transmission device includes a belt-type continuously variable transmission that includes a first pulley provided on a drive side rotating shaft, a second pulley provided on a driven side rotating shaft, a belt that runs between the first pulley and the second pulley, a first fluid pressure cylinder that can vary a groove width in the first pulley, and a second fluid pressure cylinder that can vary a groove width in the second pulley, and that is capable of continuously varying power that is transmitted from the power generation source to the drive side rotating shaft by varying the groove widths in the first and the second pulleys using the first and the second fluid pressure cylinders, and outputting the power to the driven side rotating shaft; a working fluid accumulation portion that accumulates a working fluid; a friction engagement element that is capable of transmitting the power from the power generation source to the drive side rotating shaft when the working fluid is supplied to the friction engagement element; a first pump that is driven by the power generation source and that is capable of taking in the working fluid from the working fluid accumulation portion and discharging the working fluid; a pressure regulating valve that is capable of regulating the pressure of the working fluid from the first pump and outputting the working fluid to the first and the second fluid pressure cylinders; a friction engagement element pressure regulating valve that is capable of regulating the pressure of the working fluid from the first pump side and outputting the working fluid to the friction engagement element side; a second pump that is driven by electric power and that is capable of taking in the working fluid from the working fluid accumulation portion and discharging the working fluid; and a switching valve that is capable of supplying the working fluid from the friction engagement element pressure regulating valve to the friction engagement element when the working fluid is discharged from the first pump and that is capable of supplying the working fluid from the second pump to the friction engagement element when the working fluid is not discharged from the first pump.

The power transmission device is provided with the first pump and the pressure regulating valve for supplying the working fluid to the first and second fluid cylinders side of the belt-type continuously variable transmission and regulating the pressure of the working fluid, and further, the second pump that is driven by electric power independently of the friction engagement element pressure regulating valve that regulates the pressure of the working fluid from the first pump side and outputs the working fluid to the friction engagement element side, and that is capable of taking in the working fluid from the working fluid accumulation portion and discharging the working fluid. Further, the switching valve allows the working fluid to be supplied from the friction engagement element pressure regulating valve to the friction engagement element when the working fluid is discharged from the first pump and allows the working fluid to be supplied from the second pump to the friction engagement element when the working fluid is not discharged from the first pump. Thus, when the working fluid ceases to be discharged from the first pump in conjunction with the stopping of the operation of the power generation source, if the second pump is driven by electric power, the working fluid can be supplied from the second pump to the friction engagement element through the switching valve, and the friction engagement element can be maintained in an engaged state or a state that is close to an engaged state during the time until the working fluid is discharged from the first pump in conjunction with the restarting of the power generation source after the operation of the power generation source has been stopped. Therefore, in the power transmission device, during the time from when the operation of the power generation source is stopped until the operation is restarted, it is possible to more appropriately maintain a state of connection between the power generation source and the belt-type continuously variable transmission, such that the power can be transmitted quickly from the restarted power generation source to the drive side rotating shaft of the belt-type continuously variable transmission.

The power transmission device may also be provided with a manual valve that, in coordination with a shift lever for selecting a desired shift position from among a plurality of shift positions, is capable of switching a location to which the working fluid from the switching valve is supplied, in accordance with the shift position that is selected. The friction engagement element may also be a forward friction engagement element and a reverse friction engagement element that are contained in a forward/reverse switching mechanism that is disposed between the power generation source and the belt-type continuously variable transmission, and the manual valve may also cause the working fluid from the switching valve to be supplied to the forward friction engagement element when a shift position for driving forward has been selected and may also cause the working fluid from the switching valve to be supplied to the reverse friction engagement element when a shift position for driving in reverse has been selected. Thus, the disposing of the second pump and the switching valve between the working fluid accumulation portion and the manual valve that is coordinated with the shift lever makes it possible to maintain the state of connection between the power generation source and the belt-type continuously variable transmission more appropriately during the time from when the operation of the power generation source is stopped until the operation is restarted, even if one of the shift position for driving forward and the shift position for driving in reverse is selected as the shift position.

The second pump may also be capable of generating a fluid pressure that can put the friction engagement element into a state immediately prior to engagement. In other words, even if the second pump is used, it is possible to maintain the state of connection between the power generation source and the belt-type continuously variable transmission more appropriately during the time from when the operation of the power generation source is stopped until the operation is restarted, and the second pump, as well as the entire power transmission device, can be made more compact by easing the requirement for the performance (the pump volume) of the second pump.

The second pump may also be an electromagnetic pump. This would make it possible for the second pump, as well as the entire power transmission device, to be made more compact.

The power generation source may also be an internal combustion engine that is controlled so as to automatically stop or start when a specified condition is satisfied.

The power transmission device may also include a second switching valve that allows the working fluid to flow out of the second fluid pressure cylinder when the working fluid is not discharged from the second pump and that restricts the flow of the working fluid out of the second fluid pressure cylinder when the working fluid is discharged from the second pump. Thus, when the working fluid ceases to be discharged from the first pump in conjunction with the stopping of the operation of the power generation source, if the second pump is driven by electric power, the flow of the working fluid out of the second fluid pressure cylinder is restricted by the second switching valve, and thus, the working fluid can be held within the second fluid pressure cylinder while the operation of the power generation source is stopped. Therefore, when the power generation source is restarted, it is possible to quickly ensure a sufficient amount of the working fluid within the second fluid pressure cylinder, thus making it possible to transmit the power from the power generation source to the driven side rotating shaft of the belt-type continuously variable transmission with good responsiveness. Moreover, if the driving of the second pump is stopped, the second switching valve allows the working fluid to flow out of the second fluid pressure cylinder, and therefore, it is possible to shift the gear ratio of the belt-type continuously variable transmission to the high gear side when the revolution speed of the drive side rotating shaft must be decreased, as when the vehicle is towing a load, for example.

The second switching valve may also be configured so as to open when the working fluid is not discharged from the second pump and to be closed by the pressure of the working fluid from the second pump when the working fluid is discharged from the second pump. Thus, if the second switching valve is configured so as to operate with the pressure of the working fluid that is supplied from the second pump as a signal pressure, the second switching valve can be more appropriately opened and closed, without separately providing a drive power source and a control unit for the second switching valve.

The first fluid pressure cylinder may also include a first external cylinder portion that, together with a movable sheave of the first pulley, forms a fluid pressure chamber, and a first sealing portion that is provided in a gap between the first external cylinder portion and the movable sheave. The second fluid pressure cylinder may also include a second external cylinder portion that, together with a movable sheave of the second pulley, forms a fluid pressure chamber, and a second sealing portion that is provided in a gap between the second external cylinder portion and the movable sheave. The first sealing portion may also have better sealing performance than does the second sealing portion. This makes it possible to effectively inhibit the working fluid from flowing out (leaking) from the first fluid pressure cylinder.

DETAILED DESCRIPTION OF EMBODIMENTS

Next, an embodiment of the present invention will be explained.

Figure 1:
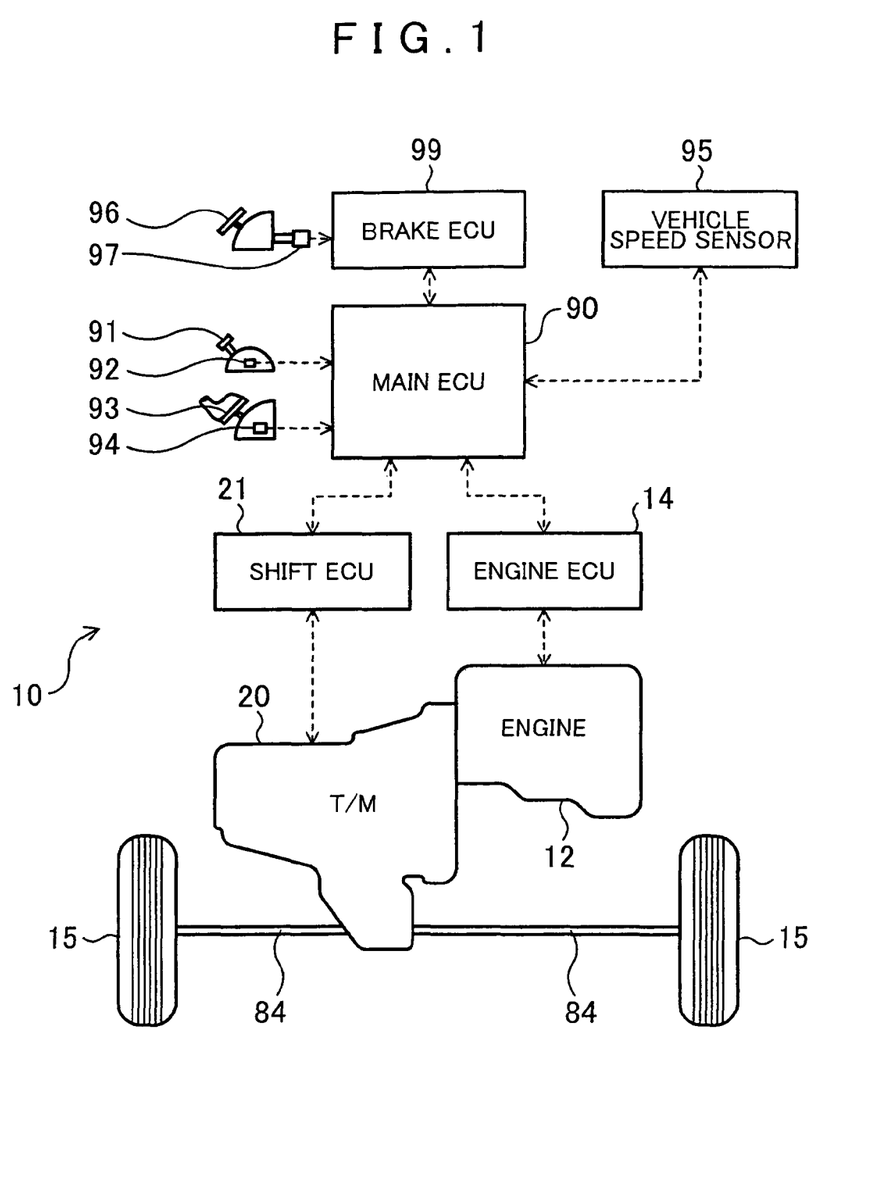
FIG. 1 is a schematic configuration diagram of an automobile 10 in which a power transmission device 20 according to an embodiment of the present invention is installed.

FIG. 1 is a schematic configuration diagram of an automobile 10 in which a power transmission device 20 according to the embodiment of the present invention is installed. The automobile 10 in the embodiment, shown in FIG. 1, is provided with an engine 12 that is an internal combustion engine that outputs power by explosive combustion of an air-fuel mixture of air and a hydrocarbon fuel such as gasoline or diesel oil, an engine electronic control unit 14 that controls the operation of the engine 12, the power transmission device 20, which is connected to a crankshaft of the engine 12 and transmits the power from the engine 12 to left and right drive wheels 15, a shift electronic control unit 21 that controls the power transmission device 20, and a main electronic control unit 90 that controls the entire vehicle.

As shown in FIG. 1, the main electronic control unit 90 receives a shift position from a shift position sensor 92 that detects an operating position of a shift lever 91 for selecting a desired shift position from among a plurality of shift positions, an accelerator opening Acc from an accelerator pedal position sensor 94 that detects an amount of depression of an accelerator pedal 93, a vehicle speed from a vehicle speed sensor 95, and the like. Further, the main electronic control unit 90 also receives signals from the engine electronic control unit 14, the shift electronic control unit 21, and a brake electronic control unit 99 that controls a brake actuator that is not shown in the drawings, based on a master cylinder pressure that is detected by a master cylinder pressure sensor 97 when a brake pedal 96 is depressed. The main electronic control unit 90 also gives command signals to the engine electronic control unit 14, the shift electronic control unit 21, and the brake electronic control unit 99 based on the signals that are input.

The engine electronic control unit 14 controls the engine 12 based on the command signals from the main electronic control unit 90, as well as on signals from various types of sensors such as a revolution speed sensor that detects the revolution speed of the crankshaft. The engine electronic control unit 14 in the embodiment is configured so as to perform, in accordance with the command signals from the main electronic control unit 90, an automatic starting and stopping control (an idle stop control) in which the operation of the engine 12 is stopped when the engine 12 is idling normally in conjunction with the stopping of the automobile 10 and restarts the engine 12 in response to a request to the automobile 10 to move forward. The request is made by a depressing of the accelerator pedal 93. In addition, the shift electronic control unit 21 and the brake electronic control unit 99 respectively control the power transmission device 20, the brake actuator that is not shown in the drawings, and the like, based on the command signals from the main electronic control unit 90, as well as on signals from various types of sensors.

Figure 2:
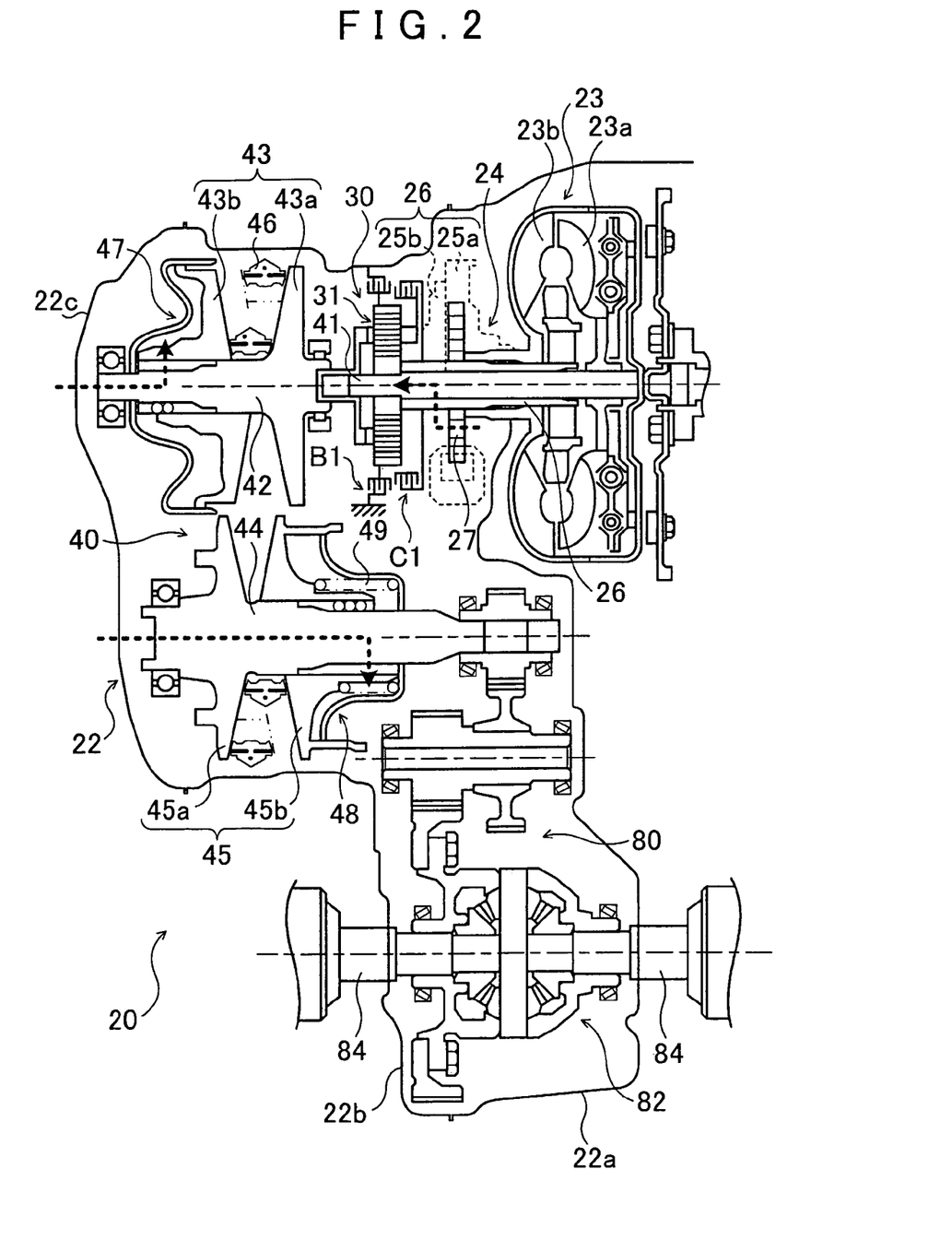
FIG. 2 is a schematic configuration diagram of the power transmission device 20.

FIG. 2 is a schematic configuration diagram of the power transmission device 20 that is installed in the automobile 10. The power transmission device 20 that is shown in FIG. 2 is configured as a transaxle that is connected to the engine 12, which is transversely arranged such that it is roughly parallel to left and right axles 84 that connect the crankshaft to the drive wheels 15. The power transmission device 20 is provided with a case 22 that includes a converter housing 22a, a transaxle case 22b, and a cover 22c that are joined into a single unit, a torque converter 23 that is accommodated in the interior of the case 22, an oil pump 24, a forward/reverse switching mechanism 30, a belt-type continuously variable transmission (hereinafter called a CVT) 40, a gear mechanism 80, a differential mechanism (a differential gear) 82, and the like.

The torque converter 23 includes a pump impeller 23a on the input side that is connected to the crankshaft of the engine 12 and a turbine runner 23b on the output side that is fixed to an input shaft 41 of the CVT 40. The torque converter 23 also has a lockup clutch function. As shown in FIG. 2, the oil pump 24 is configured as a gear pump that is provided with a pump assembly 26 that includes a pump body 25a and a pump cover 25b and an external gear 27 that is connected to the pump impeller 23a of the torque converter 23 through a hub. By using the power from the engine 12 to rotate the external gear 27, the oil pump 24 draws in a working fluid (an ATF) that has accumulated in an oil pan 29 through a strainer 28 (refer to FIG. 3 for both) and discharges the working fluid, thus generating a hydraulic pressure that is required by the CVT 40 and the forward/reverse switching mechanism 30 and supplying the working fluid to lubricated portions such as various types of bearings.

The forward/reverse switching mechanism 30 includes a double pinion type planetary gear mechanism 31, a brake (a reverse clutch) B1 that is a hydraulic clutch, and a clutch (a forward clutch) C1. The planetary gear mechanism 31 has a sun gear that is fixed to the input shaft 41 of the CVT 40, a ring gear, and a carrier that supports a pinion gear meshing with the sun gear and a pinion gear meshing with the ring gear, and that is coupled to a primary shaft 42 of the CVT 40. The brake B1 can fix the ring gear of the planetary gear mechanism 31 in relation to the transaxle case 22b and can also release the ring gear such that the ring gear rotates. The clutch C1 can fix the carrier of the planetary gear mechanism 31 in relation to the input shaft 41 (the sun gear) and can also release the carrier such that the carrier rotates. Thus releasing the brake B1 and engaging the clutch C1 makes it possible to move the vehicle forward by transmitting to the primary shaft 42 of the CVT 40 the power that is transmitted from the engine 12 to the input shaft 41 through the torque converter 23. This also makes it possible to move the vehicle in reverse by transmitting the power from the input shaft 41 to the primary shaft 42 of the CVT 40 while reversing the direction of rotation by engaging the brake B1 and releasing the clutch C1. Moreover, the connection between the input shaft 41 (the engine 12) and the primary shaft 42 (the CVT 40) can be released by releasing both the brake B1 and the clutch C1.

Figure 3:
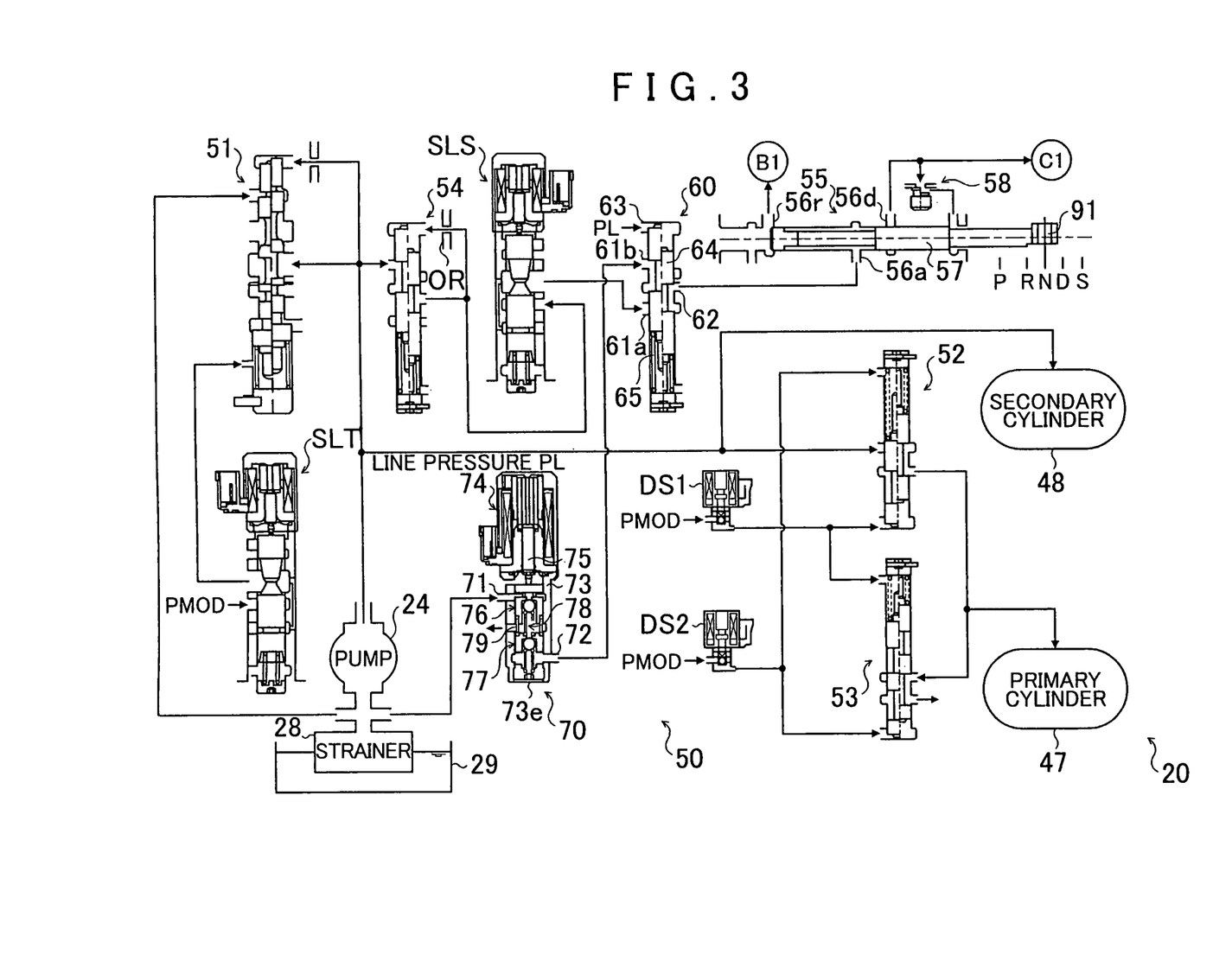
FIG. 3 is a system diagram that shows an overview of a hydraulic circuit 50 that is included in the power transmission device 20.

The CVT 40 includes a primary pulley 43 that is provided on the primary shaft 42, which serves as a drive side rotating shaft; a secondary pulley 45 that is provided on a secondary shaft 44 that serves as a driven side rotating shaft that is arranged parallel to the primary shaft 42; a belt 46 that passes through a groove on the primary pulley 43 and a groove on the secondary pulley 45; the primary cylinder 47, which serves as a hydraulic actuator for varying the width of the groove on the primary pulley 43; and the secondary cylinder 48, which serves as a hydraulic actuator for varying the width of the groove on the secondary pulley 45. The primary pulley 43 is configured from a fixed sheave 43a that is formed as a single unit with the primary shaft 42 and a movable sheave 43b that is supported slidably in the axial direction through a ball spline in the primary shaft 42. The secondary pulley 45 is configured from a fixed sheave 45a that is formed as a single unit with the secondary shaft 44, and a movable sheave 45b that is supported slidably in the axial direction through a ball spline in the secondary shaft 44 and is urged in the axial direction by a return spring 49 that is a compression spring. Furthermore, the primary cylinder 47 is formed to the rear of the movable sheave 43b of the primary pulley 43, and the secondary cylinder 48 is formed to the rear of the movable sheave 45b of the secondary pulley 45. The working fluid that causes the groove widths of the primary pulley 43 and the secondary pulley 45 to vary is supplied to the primary cylinder 47 and the secondary cylinder 48 from a hydraulic circuit 50, an example of which is shown in FIG. 3. This makes it possible for the power that is input to the primary shaft 42 from the engine 12 through the torque converter 23 and the forward/reverse switching mechanism 30 to be varied continuously and to be output to the secondary shaft 44. The power that is output to the secondary shaft 44 is then transmitted to the left and right drive wheels 15 through the gear mechanism 80 and the differential gear 82.

As shown in FIG. 3, the hydraulic circuit 50 includes the oil pump 24, which, in order to operate the CVT 40, uses the power from the engine 12 to take in the working fluid from the oil pan 29 through the strainer 28 and discharges the working fluid; a regulator valve 51 that generates a line pressure PL by regulating the pressure of the working fluid that is pumped by the oil pump 24; a linear solenoid valve SLT that drives the regulator valve 51 by using the working fluid from a modulator valve that is not shown in the drawings and that generates a modulator pressure PMOD by regulating the line pressure PL; a control valve 52 that is capable of supplying the working fluid to the primary cylinder 47 that causes the line pressure PL to operate on the movable sheave 43b and is also capable of cutting off the supply of the working fluid to the primary cylinder 47; a duty solenoid valve DS1 that uses the modulator pressure PMOD to drive the control valve 52; a control valve 53 that is capable of draining the working fluid from within the primary cylinder 47 and is also capable of cutting off the draining from the primary cylinder 47; and a duty solenoid valve DS2 that uses the modulator pressure PMOD to drive the control valve 53. Note that the hydraulic circuit 50 in the embodiment is configured to supply the working fluid to the secondary cylinder 48 such that the line pressure PL acts directly on the movable sheave 43b, but the working fluid may also be supplied to the secondary cylinder 48 through a pressure regulating valve (a belt clamping pressure control valve) that is not shown in the drawings and that regulates the line pressure and the like.

The hydraulic circuit 50 also includes a line pressure regulating valve 54 that regulates (decreases) the line pressure PL by operating in coordination with an orifice OR to cause the brake B1 and the clutch C1 of the forward/reverse switching mechanism 30 to operate; a linear solenoid valve SLS that is capable of regulating the pressure of the working fluid from the line pressure regulating valve 54 and outputting the working fluid at the regulated pressure; a manual valve 55 that operates in coordination with the shift lever 91; a switching valve (a relay valve) 60 that has first and second input ports 61a, 61b and an output port 62 and that operates the line pressure PL as a signal pressure; and an electromagnetic pump 70 that is driven by electric power from an auxiliary battery that is not shown in the drawings and that takes in the working fluid from the oil pan 29 through an intake port 71 and the strainer 28 and discharges the working fluid from a discharge port 72. Note that the electronic parts such as the linear solenoid valves SLT, SLS and the electromagnetic pump 70 are all controlled by the shift electronic control unit 21.

The manual valve 55 includes an input port 56a that is connected to the output port 62 of the switching valve 60; a D (drive) position output port 56d that is connected to a working fluid intake portion of the clutch C1 of the forward/reverse switching mechanism 30; an R (reverse) position output port 56r that is connected to a working fluid intake portion of the brake B1 of the forward/reverse switching mechanism 30; and a spool 57 that is slidable in the axial direction in coordination with the shift lever 91. When one of a P position and an N (neutral) position is selected as the shift position by the driver, a passage between the input port 56a to the D position output port 56d and the R position output port 56r is closed off by the spool 57. Further, when one of a D position and an S (sequential) position for sports driving is selected as the shift position by the driver, the spool 57 opens a passage only between the input port 56a and the D position output port 56d, making it possible for the working fluid to be supplied to the clutch (the forward clutch) C1 of the forward/reverse switching mechanism 30. Furthermore, when an R position is selected as the shift position by the driver, the spool 57 opens a passage only between the input port 56a and the R position output port 56r, making it possible for the working fluid to be supplied to the brake (the reverse clutch) B1 of the forward/reverse switching mechanism 30. Thus the manual valve 55, in coordination with the shift lever 91, can switch the location to which the working fluid from the switching valve 60 is supplied, in accordance with the shift position that is selected by the driver. Note that a flow passage that connects the D position output port 56d and the clutch C1 is connected to a drain port of the manual valve 55 through a check valve 58, and the working fluid within the clutch C1 is drained to the oil pan 29 side through the check valve 58 and the drain port of the manual valve 55.

In addition to first and second input ports 61a, 61b and the output port 62, the switching valve 60 is provided with a signal pressure input port 63 that is formed into a valve body or the like in the same manner as the other ports and that operates the line pressure PL as a signal pressure; a spool 64 that can slide in the axial direction; and a spring 65 that urges the spool 64 in the axial direction. In the switching valve 60, when the oil pump 24 is driven by the engine 12, the line pressure PL that is input through the signal pressure input port 63 moves the spool 64 against the urging force of the spring 65 to a position that is shown in the right half of the switching valve 60 in FIG. 3. This opens a passage between the first input port 61a and the output port 62 and closes a passage between the second input port 61b and the output port 62, making it possible for the working fluid to be supplied from the linear solenoid valve SLS to the input port 56a of the manual valve 55 through the switching valve 60. Furthermore, when the oil pump 24 ceases to be driven by the engine 12, the spool 64 is moved by the urging force of the spring 65 to a position that is shown in the left half of the switching valve 60 in FIG. 3. This opens the passage between the second input port 61b and the output port 62 and closes the passage between the first input port 61a and the output port 62, making it possible for the working fluid to be supplied from the electromagnetic pump 70 to the input port 56a of the manual valve 55 through the switching valve 60.

The electromagnetic pump 70 is provided with a sleeve 73 in which the intake port 71 and the discharge port 72 are formed; a solenoid portion 74 that is connected to the sleeve 73; a shaft 75 that is caused to move forward and back in the axial direction by the solenoid portion 74; an intake check valve 76 that is disposed within the sleeve 73 and is connected to a tip end of the shaft 75; a discharge check valve 77 that is disposed within the sleeve 73 so as to be positioned between the intake check valve 76 and an end plate 73e; a pump chamber 78 that is formed within the sleeve 73 between the intake check valve 76 and the discharge check valve 77; and a spring 79 that is positioned between the intake check valve 76 and the discharge check valve 77 and that urges the shaft 75 toward the solenoid portion 74 side through the body of the intake check valve 76. When electricity to a coil of the solenoid portion 74 is turned off, the shaft 75 is moved by the urging force of the spring 79 from the end plate 73e side to the solenoid portion 74 side, and when the electricity to the coil of the solenoid portion 74 is turned on, the shaft 75 moves from the solenoid portion 74 side to the end plate 73*e* against the urging force of the spring 79. In addition, when the pressure within the pump chamber 78 becomes negative (or becomes a pressure that is lower than the pressure on the intake port 71 side by a specified value), the intake check valve 76 opens and permits the working fluid to flow from the intake port 71 into the pump chamber 78, and when the pressure within the pump chamber 78 becomes positive (or exceeds a pressure that is higher than the pressure on the intake port 71 side by a specified value), the intake check valve 76 closes and restricts the flow of the working fluid from the intake port 71 into the pump chamber 78. When the pressure within the pump chamber 78 becomes positive (or exceeds a pressure that is higher than the pressure on the discharge port 72 side by a specified value), the discharge check valve 77 opens and permits the working fluid to flow out of the pump chamber 78 to the discharge port 72, and when the pressure within the pump chamber 78 becomes negative (or becomes a pressure that is lower than the pressure on the discharge port 72 side by a specified value), the discharge check valve 77 closes and restricts the flow of the working fluid out of the pump chamber 78 to the discharge port 72.

In the electromagnetic pump 70 that is configured in this manner, when the electricity to the coil of the solenoid portion 74 has been turned on and the electricity to the coil is then turned off, the shaft 75 moves from the end plate 73*e* side to the solenoid portion 74 side, and in conjunction with that, the pressure within the pump chamber 78 becomes negative. Therefore, the intake check valve 76 opens and the discharge check valve 77 closes, causing the working fluid within the oil pan 29 to be taken into the pump chamber 78 through the strainer 28 and the intake port 71. In this state, if the electricity to the coil of the solenoid portion 74 is turned on, the shaft 75 moves from the solenoid portion 74 side to the end plate 73*e* side, and in conjunction with that, the pressure within the pump chamber 78 becomes positive. Therefore, the intake check valve 76 closes and the discharge check valve 77 opens, causing the working fluid that has been taken into the pump chamber 78 to be discharged from the discharge port 72 through the discharge check valve 77. Therefore, if a square wave electric current of a specified duty ratio is applied to the coil of the solenoid portion 74, it becomes possible for the electromagnetic pump 70 to draw the working fluid from the oil pan 29 and to supply the working fluid to the switching valve 60.

Next, an operation of the power transmission device 20 that is installed in the automobile 10 described above will be explained.

Since the engine 12 is operated when the automobile 10 is moving in the forward direction or the reverse direction by the power from the engine 12, the oil pump 24 is driven by the power from the engine 12, and the line pressure PL is generated by the regulating of the pressure of the working fluid from the oil pump 24 by the regulator valve 51, which is driven by the linear solenoid valve SLT. The working fluid whose pressure is regulated by the line pressure regulating valve 54 is supplied to the linear solenoid valve SLS, and the passage between the first input port 61*a* and the output port 62 of the switching valve 60 is opened by inputting the line pressure PL as a signal pressure to the signal pressure input port 63 of the switching valve 60. Thus, when the engine 12 is operated, the working fluid whose pressure is regulated by the linear solenoid valve SLS is supplied to the input port 56*a* of the manual valve 55 through the switching valve 60, and therefore, even if the driver selects, as the shift position, one of the driving positions such as the D position (the S position) and the R position, the working fluid can be reliably supplied from the linear solenoid valve SLS to the brake B1 or the clutch C1 of the forward/reverse switching mechanism 30.

In contrast to this, when the operation of the engine 12 is stopped because the engine electronic control unit 14 performs automatic starting and stopping processing when the automobile 10 is stopped waiting for a traffic signal or the like, for example, the driving of the oil pump 24 is also stopped. Therefore, the line pressure PL drops, and it becomes impossible to supply a sufficient amount of the working fluid from the linear solenoid valve SLS to the forward/reverse switching mechanism 30 to maintain the engaging of the brake B1 or the clutch C1. Therefore, in the automobile 10 in the embodiment, the revolution speed of the engine 12 when a sufficient amount of the working fluid is not discharged from the oil pump 24 (when a discharge pressure of the oil pump 24 falls to no more than a specified value, for example) is defined as a threshold value Nref (a value in the range of 1000 to 1500 rpm, for example), and based on control by the shift electronic control unit 21, the square wave electric current of the specified duty ratio is applied to the coil of the solenoid portion 74 from the stage when the revolution speed of the engine 12 becomes no more than the threshold value Nref until the revolution speed of the restarted engine 12 becomes greater than the threshold value Nref, such that the working fluid is drawn from the oil pan 29 by the electromagnetic pump 70 and supplied to the working fluid to the switching valve 60 through the discharge port 72. Furthermore, when the line pressure PL drops as the working fluid ceases to be discharged from the oil pump 24 due to the stopping of the operation of the engine 12, the pressure that acts on the spool 64 of the switching valve 60 through the signal pressure input port 63 also drops, and therefore, as the spool 64 moves, the passage between the second input port 61*b* and the output port 62 is opened, and the passage between the first input port 61*a* and the output port 62 is closed. Thus, the working fluid can be supplied from the electromagnetic pump 70 to the input port 56*a* of the manual valve 55 through the switching valve 60. Therefore, when the operation of the engine 12 is stopped, the working fluid can be reliably supplied from the electromagnetic pump 70 to the brake B1 or the clutch C1 of the forward/reverse switching mechanism 30, even if the driver selects one of the driving positions, such as the D position (the S position) and the R position, as the shift position. Note that when the operation of the engine 12 is stopped because the engine electronic control unit 14 performs the automatic starting and stopping processing, it is not absolutely necessary for the brake B1 or the clutch C1 of the forward/reverse switching mechanism 30 to be maintained in a completely engaged state. Therefore, in the embodiment, a unit that can generate a hydraulic pressure that is sufficient for the brake B1 or the clutch C1 to be put into a state immediately prior to engagement (immediately prior to complete engagement) (a hydraulic pressure that is sufficient to eliminate the stroke in the hydraulic actuator) while the operation of the engine 12 is stopped is used as the electromagnetic pump 70.

As explained above, the power transmission device 20 that is installed in the automobile 10 is provided with the oil pump 24, the regulator valve 51, and the linear solenoid valve SLT that supply the working fluid to the side of the primary cylinder 47 and the secondary cylinder 48 of the CVT 40 and regulate the pressure of the working fluid, and the electromagnetic pump 70, which is driven by electric power independently of the linear solenoid valve SLS that regulates the pressure of the working fluid from the oil pump 24 and outputs the working fluid with the regulated pressure to the brake B1 and clutch C1 side, and which is capable of drawing in the working fluid from the oil pan 29 and discharging the working fluid. Furthermore, when the oil pump 24 is driven by the engine 12 and the working fluid is discharged from the oil pump 24, the switching valve 60 permits the working fluid to be supplied from the linear solenoid valve SLS to the brake B1 or the clutch C1 of the forward/reverse switching mechanism 30. Additionally, when the oil pump 24 is not driven by the engine 12 and the working fluid is not discharged from the oil pump 24, the switching valve 60 permits the working fluid to be supplied from the electromagnetic pump 70 to the brake B1 or the clutch C1.

Thus, when the working fluid substantially ceases to be discharged from the oil pump 24 in conjunction with the stopping of the operation of the engine 12, if the electromagnetic pump 70 is driven by electric power, the working fluid can be supplied from the electromagnetic pump 70 to the brake B1 or the clutch C1 through the switching valve 60, and the brake B1 or the clutch C1 can be maintained in a state that is close to a coupled state (or in a coupled state) during the time until the working fluid is discharged from the oil pump 24 in conjunction with the restarting of the engine 12 after the operation of the engine 12 has been stopped. Therefore, in the power transmission device 20 in the embodiment, during the time from when the operation of the engine 12 is stopped until the operation is restarted, it is possible to more appropriately maintain a state of connection between the engine 12 and the CVT 40, such that the power can be transmitted quickly from the restarted engine 12 to the primary shaft 42 of the CVT 40. Note that the switching valve 60 is not limited to operating the line pressure PL as the signal pressure as described above, and may be an on-off valve, for example.

The power transmission device 20 in the embodiment also has the manual valve 55, which, in coordination with the shift lever 91 for selecting the desired shift position from among the plurality of shift positions, can switch the location to which the working fluid is supplied from the switching valve 60, in accordance with the selected shift position. Moreover, when one of the shift positions for driving forward, such as the D position and the S position, is selected, the manual valve 55 operates such that the working fluid from the switching valve 60 is supplied to the clutch C1 for moving forward, and when the R position is selected, the manual valve 55 operates such that the working fluid from the switching valve 60 is supplied to the brake B1 for moving in reverse. Therefore, the disposing of the electromagnetic pump 70 and the switching valve 60 between the oil pan 29 and the manual valve 55, as in the embodiment that is described above, makes it possible to maintain the state of connection between the engine 12 and the CVT 40 more appropriately during the time from when the operation of the engine 12 is stopped until the operation is restarted, even if one of the D position or the like for moving forward and the R position for moving in reverse is selected as the shift position.

Furthermore, in the embodiment that is described above, a unit that can generate a hydraulic pressure that is sufficient for the brake B1 or the clutch C1 to be put into the state immediately prior to engagement is used as the electromagnetic pump 70. In other words, if the electromagnetic pump 70 that has this sort of performance is used, it is possible to maintain the coupled state of the engine 12 and the CVT 40 more appropriately during the time from when the operation of the engine 12 is stopped until the operation is restarted, and the electromagnetic pump 70, as well as the entire power transmission device 20, can be made more compact by reducing the performance (the pump volume) that is required of the electromagnetic pump 70. Note that using the electromagnetic pump 70 as in the embodiment that is described above makes it possible to make both the hydraulic circuit 50 and the entire power transmission device 20 more compact, but it is obvious that an electrically driven pump may also be used instead of the electromagnetic pump 70.

Installing the power transmission device 20 like that described above in the automobile 10 provided with the engine 12 that is controlled by the engine electronic control unit 14 so as to start and stop automatically makes it possible for the power to be transmitted quickly to the primary shaft 42 of the CVT 40 from the engine 12 that has been restarted after its operation has been stopped. Therefore, it is possible to ensure good driving performance in the automobile 10 when the automobile 10 is restarted after the engine 12 has been stopped automatically.

Next, a power transmission device 20B according to a modified example will be explained. The power transmission device 20B can also be used in the automobile 10 that is described above, and has basically the same configuration as that of power transmission device 20 that is described above. Accordingly, the same reference numerals are used for elements that are the same as those that have already been explained with regard to the automobile 10 and the power transmission device 20 in the embodiment that is described above, and explanations thereof will not be repeated.

Figure 4:
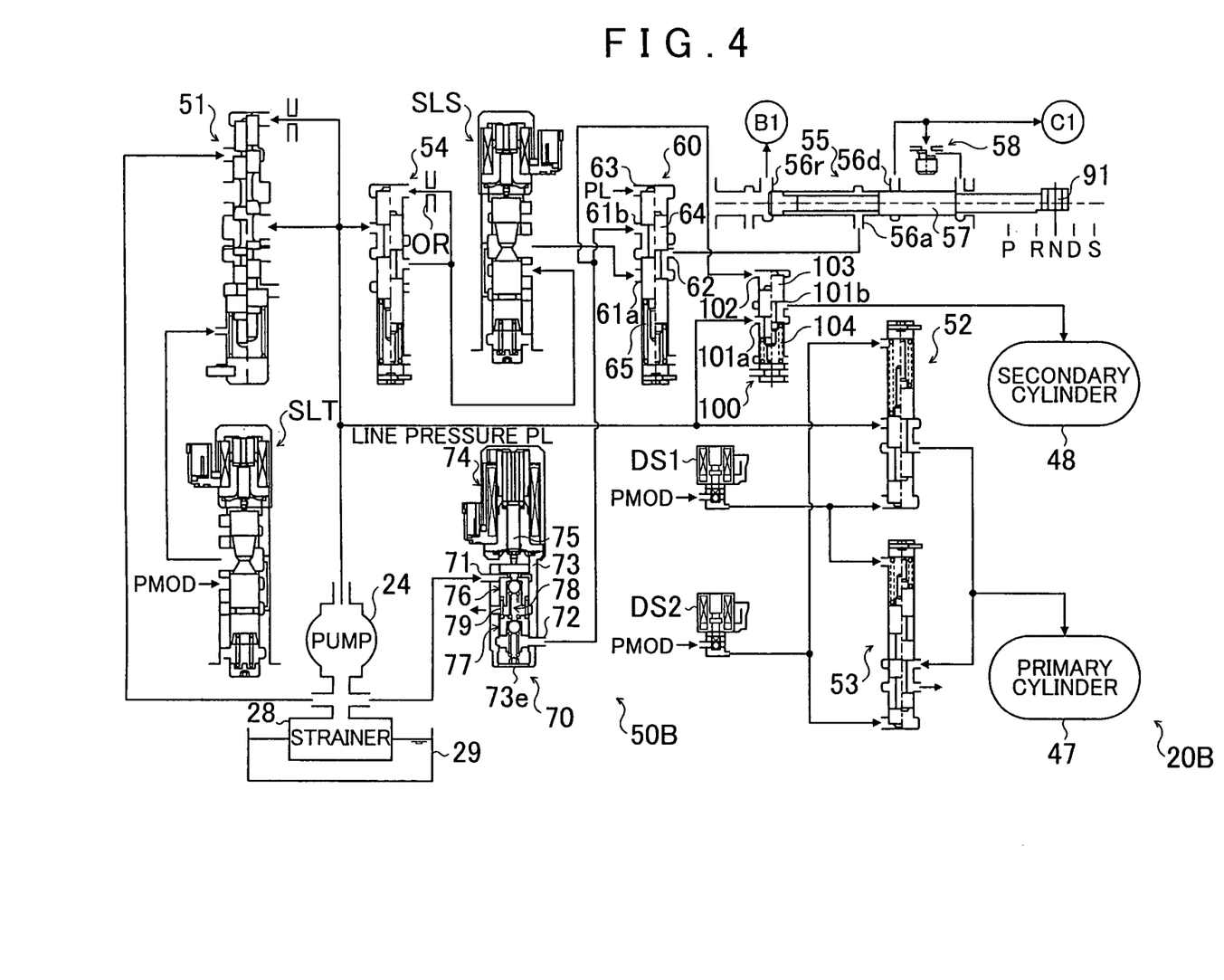
FIG. 4 is a system diagram that shows an overview of a hydraulic circuit 50B that is included in a power transmission device 20B according to a modified example.

FIG. 4 is a system diagram that shows an overview of a hydraulic circuit 50B that is included in the power transmission device 20B according to the modified example. As shown in FIG. 4, the hydraulic circuit 50B differs from the hydraulic circuit 50 that is described above in that the hydraulic circuit 50B further includes a second switching valve 100 that is incorporated into a flow passage that connects the regulator valve 51 and the secondary cylinder 48. The second switching valve 100 is provided with an input port 101a that is continuous with the regulator valve 51 (the oil pump 24) side and an output port 101b that is continuous with the secondary cylinder 48. Further, the second switching valve 100 is provided with a signal pressure input port 102 that is formed into a valve body or the like in the same manner as the other ports and that inputs, as a signal pressure, the pressure of the working fluid that is pumped from the electromagnetic pump 70; a spool 103 that is slidable in the axial direction; and a spring 104 that urges the spool 103 in the axial direction. In the second switching valve 100, when the electromagnetic pump 70 is not driven, such that the working fluid is not supplied from the electromagnetic pump 70 to the signal pressure input port 102, the spool 103 is moved by the urging force of the spring 104 to a position that is shown in the right half of the second switching valve 100 in FIG. 4. This opens the second switching valve 100 such that a passage is opened between the input port 101a and the output port 101b, that is, between the regulator valve 51 side and the secondary cylinder 48. Furthermore, when the electromagnetic pump 70 is driven and the working fluid is discharged, the pressure of the working fluid that is discharged from the electromagnetic pump 70 is input through the signal pressure input port 102 and moves the spool 103 against the urging force of the spring 104 to a position that is shown in the left half of the second switching valve 100 in FIG. 4. This closes the second switching valve 100 such that the passage between the input port 101a and the output port 101b is closed, that is, the passage between the regulator valve 51 side and the secondary cylinder 48 is closed.

Figure 5:
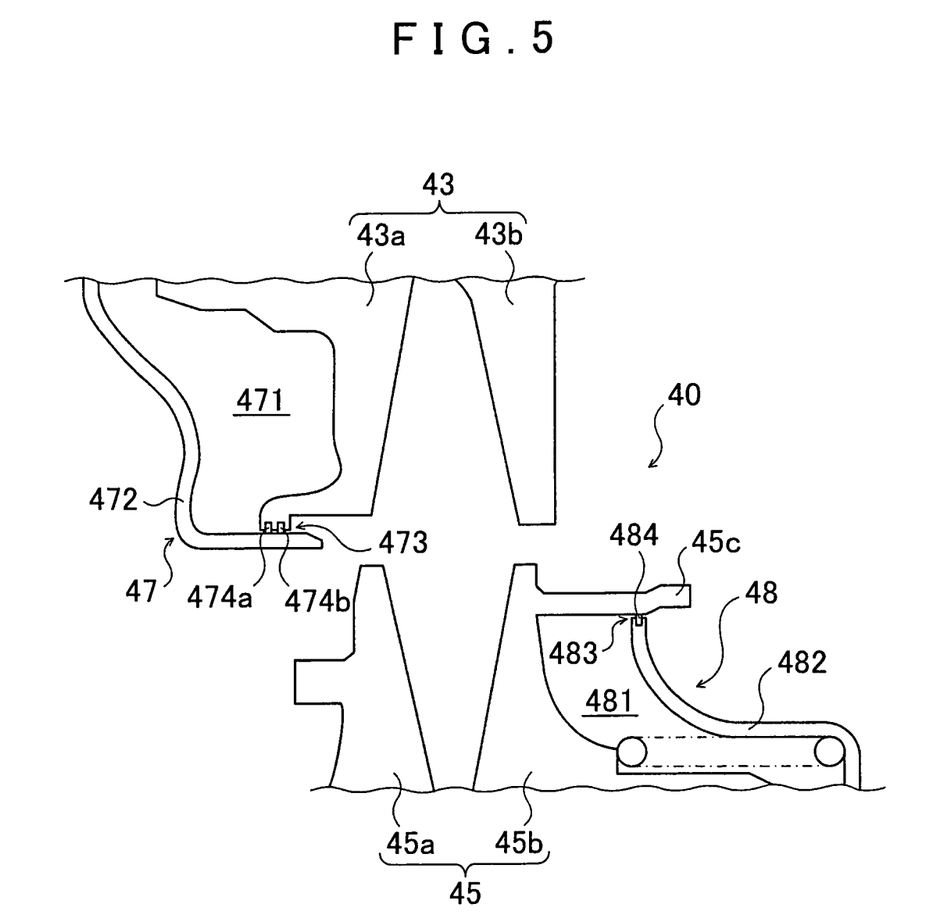
FIG. 5 is a schematic configuration diagram that shows a primary cylinder 47 and a secondary cylinder 48 that are included in the power transmission device 20B.

Further, as shown in FIG. 5, the primary cylinder 47 of the CVT 40 that is included in the power transmission device 20B includes a fluid pressure chamber 471 that is filled with the working fluid from the regulator valve 51 (the oil pump 24) side; an external cylinder portion 472 that, together with the movable sheave 43b of the primary pulley 43, forms the fluid pressure chamber 471; and a sealing portion 473 that is provided in a gap between an outer peripheral face of the movable sheave 43b and an inner peripheral face of the external cylinder portion 472. In the modified example, the sealing portion 473 of the primary cylinder 47 is configured by fitting sealing rings 474a, 474b into two ring-shaped grooves that are formed in the outer peripheral face of the movable sheave 43b such that the sealing rings 474a, 474b contact the inner peripheral face of the external cylinder portion 472, as shown in FIG. 5. In the same manner, the secondary cylinder 48 of the CVT 40 that is included in the power transmission device 20B includes a fluid pressure chamber 481 that is filled with the working fluid from the regulator valve 51 (the oil pump 24) side; an external cylinder portion 482 that, together with the movable sheave 45b of the secondary pulley 45, forms the fluid pressure chamber 481; and a sealing portion 483 that is provided in a gap between an end face of the external cylinder portion 482 and an inner peripheral face of a cylindrical portion 45c that extends from the movable sheave 45b. In the modified example, the sealing portion 483 of the secondary cylinder 48 is configured by fitting a sealing rings 484 into one ring-shaped groove that is formed in the end face of the external cylinder portion 482 such that the fitting sealing ring 484 contacts the inner peripheral face of the cylindrical portion 45c, as shown in FIG. 5.

In other words, in the modified example, the sealing portion 473 of the primary cylinder 47 has better sealing performance than does the sealing portion 483 of the secondary cylinder 48. Thus, even if the external cylinder portion 472 and the like of the primary cylinder 47 are configured such that the working fluid can be retained to a certain extent on the outer circumference side of the fluid pressure chamber 471 by improving the performance of the sealing portion 473 of the primary cylinder 47, it is possible to effectively inhibit the working fluid within the fluid pressure chamber 471 from flowing out through (leaking from) the gap between the movable sheave 43b and the external cylinder portion 472 due to the effect of centrifugal force when the primary pulley 43 is rotating. It is also possible to effectively inhibit the working fluid within the fluid pressure chamber 471 from flowing out through the gap between the movable sheave 43b and the external cylinder portion 472 when the rotation of the primary pulley 43 is stopped. It is also possible to hold the working fluid securely within the fluid pressure chamber 471 when the primary pulley 43 is rotating and when the rotation of the primary pulley 43 is stopped.

In the automobile 10 in which the power transmission device 20B that includes the hydraulic circuit 50B described above and the CVT 40 is installed, since the engine 12 is operated when the automobile 10 moves in the forward direction or the reverse direction by the power from the engine 12, the electromagnetic pump 70 is not driven, and the line pressure PL is generated in a manner such that the regulator valve 51, which is driven by the linear solenoid valve SLT, regulates the pressure of the working fluid from the oil pump 24 driven by the power from the engine 12. At this time, since the electromagnetic pump 70 is not driven and does not discharge the working fluid, the second switching valve 100 opens, opening the passage between the input port 101a and the output port 101b, which allows the working fluid whose pressure is regulated to the line pressure PL by the regulator valve 51 to be supplied to the fluid pressure chamber 481 of the secondary cylinder 48 and allows the working fluid to flow out from the fluid pressure chamber 481 to the regulator valve 51 side. On the other hand, if a sufficient amount of the working fluid is not discharged from the oil pump 24 because the operation of the engine 12 is stopped when the automobile 10 is stopped or the like, the electromagnetic pump 70 is driven. The working fluid is then supplied from the electromagnetic pump 70 to the brake B1 or the clutch C1 of the forward/reverse switching mechanism 30 through the switching valve 60, and the working fluid is also supplied from the electromagnetic pump 70 to the signal pressure input port 102 of the second switching valve 100. Thus, when the electromagnetic pump 70 is driven and discharges the working fluid, the second switching valve 100 closes, closing off the passage between the input port 101a and the output port 101b. Therefore, the outflow of the working fluid from the fluid pressure chamber 481 of the secondary cylinder 48 to the regulator valve 51 side can be restricted, and the working fluid can be held within the fluid pressure chamber 481.

As explained above, the power transmission device 20B in the modified example has the second switching valve 100, which allows the working fluid to flow from the regulator valve 51 (the oil pump 24) side to the secondary cylinder 48 (the fluid pressure chamber 481) and allows the working fluid to flow out of the secondary cylinder 48 when the working fluid is not discharged from the electromagnetic pump 70, and which restricts the flow of the working fluid out of the secondary cylinder 48 when the working fluid is discharged from the electromagnetic pump 70. Thus, when the working fluid ceases to be discharged from the oil pump 24 in conjunction with the stopping of the operation of the engine 12, if the electromagnetic pump 70 is driven by electric power, the flow of the working fluid out of the secondary cylinder 48 is restricted by the second switching valve 100, and therefore, the working fluid can be held within the secondary cylinder 48 while the operation of the engine 12 is stopped. Therefore, if the driving of the electromagnetic pump 70 is stopped and the oil pump 24 starts to be driven in conjunction with the restarting of the operation of the engine 12, it is possible to fill the fluid pressure chamber 481 quickly with the working fluid from the regulator valve 51 (the oil pump 24) side and to quickly ensure a sufficient amount of the working fluid within the secondary cylinder 48, thus making it possible to transmit the power from the engine 12 to the secondary shaft 44 of the CVT 40 with good responsiveness. Moreover, if the driving of the electromagnetic pump 70 is stopped, the second switching valve 100 allows the working fluid to flow out of the secondary cylinder 48. Therefore, it is possible to shift the gear ratio of the CVT 40 to the high gear side by stopping the driving of the electromagnetic pump 70 when the revolution speed of the primary shaft 42 needs be decreased, as when the automobile 10 is towing a load, for example. Therefore, the power transmission device 20B makes it possible to effectively inhibit metal wear and the generation of noise when the automobile 10 is towing a load.

In addition, in the modified example, the second switching valve 100 is configured so as to open when the working fluid is not discharged from the electromagnetic pump 70 and to be closed by the pressure of the working fluid from the electromagnetic pump 70 when the working fluid is discharged from the electromagnetic pump 70. Thus, if the second switching valve 100 is configured so as to operate with the pressure of the working fluid that is supplied from the electromagnetic pump 70 as a signal pressure, the second switching valve 100 can be more appropriately opened and closed, without separately providing a drive power source, such as a solenoid portion, and a control unit for the second switching valve 100. However, it is obvious that the second switching valve 100 may also be configured as an electromagnetically driven on-off valve, for example. Furthermore, if the sealing portion 473 of the primary cylinder 47 is provided with better sealing performance than the sealing portion 483 of the secondary cylinder 48, as in the modified example that is described above, it becomes possible to effectively inhibit the working fluid from flowing out (leaking) from the primary cylinder 47, so even if no particular valve or the like is used to restrict the working fluid from flowing out from the primary cylinder 47, it is possible to hold the working fluid within the primary cylinder 47 when the working fluid is not discharged from oil pump 24 in conjunction with the stopping of the operation of the engine 12. While the flowing out (leaking) of the working fluid from the primary cylinder 47 is effectively inhibited by providing the sealing portion 473 of the primary cylinder 47 with better sealing performance than the sealing portion 483 of the secondary cylinder 48, it is obvious that a valve or the like that can restrict the working fluid from flowing out from the primary cylinder 47 may also be used. Note that the hydraulic circuit 50B according to the modified example may also be configured such that the working fluid is supplied to the secondary cylinder 48 through a pressure regulating valve (a belt clamping pressure control valve) that is not shown in the drawings and that regulates the line pressure and the like, and that in this case, the second switching valve 100 may also be disposed between the pressure regulating valve (the belt clamping pressure control valve) and the secondary cylinder 48.

Next, a correspondence relationships between the main elements in the embodiment and the main elements of the present invention that are described in the "Summary of the Invention" section will be explained. In the embodiment, the CVT 40 that includes the primary pulley 43 that is a first pulley provided on the primary shaft 42 serving as the drive side rotating shaft, the secondary pulley 45 that is a second pulley provided on the secondary shaft 44 serving as the driven side rotating shaft, the belt 46 that runs between the primary pulley 43 and the secondary pulley 45, the primary cylinder 47 serving as a first fluid pressure cylinder that can vary the width of the groove on the primary pulley 43, and the secondary cylinder 48 serving as a second fluid pressure cylinder that can vary the width of the groove on the secondary pulley 45 corresponds to a "belt-type continuously variable transmission". The oil pan 29 that accumulates the working fluid corresponds to a "working fluid accumulation portion". The brake B1 and the clutch C1 of the forward/reverse switching mechanism 30 that can transmit the power from the engine 12 to the primary shaft 42 side with the supply of the working fluid correspond to "friction engagement elements". The oil pump 24 that is driven by the engine 12 and can take in the working fluid from the oil pan 29 and discharge the working fluid corresponds to a "first pump". The regulator valve 51 that can regulate the pressure of the working fluid from the oil pump 24 and output the working fluid to the primary cylinder 47 and the secondary cylinder 48 side corresponds to a "pressure regulating valve". The linear solenoid valve SLS that can regulate the pressure of the working fluid from the oil pump 24 side and output the working fluid to the brake B1 and the clutch C1 side corresponds to a "friction engagement element pressure regulating valve". The electromagnetic pump 70 that is driven by electric power and can take in the working fluid from the oil pan 29 and discharge the working fluid corresponds to a "second pump". The switching valve 60 that can supply the working fluid from the linear solenoid valve SLS to the brake B1 or the clutch C1 when the working fluid is discharged from the oil pump 24 and can supply the working fluid from the electromagnetic pump 70 to the brake B1 or the clutch C1 when the working fluid is not discharged from the oil pump 24 corresponds to a "switching valve". The manual valve 55 that, in coordination with the shift lever 91 for selecting the desired shift position from among the plurality of shift positions, can switch the location to which the working fluid from the switching valve 60 is supplied, in accordance with the shift position selected, corresponds to a manual valve. The second switching valve 100 that allows the working fluid to flow out of the secondary cylinder 48 when the working fluid is not discharged from the electromagnetic pump 70 and restricts the flow of the working fluid out of the secondary cylinder 48 when the working fluid is discharged from the electromagnetic pump 70 corresponds to a "second switching valve". The external cylinder portion 472 corresponds to a "first external cylinder portion", and the external cylinder portion 482 corresponds to a "second external cylinder portion". The sealing portion 473 corresponds to a "first sealing portion", and the sealing portion 483 corresponds to a "second sealing portion". However, the correspondence relationships between the main elements in the embodiment and the modified example and the main elements of the present invention that are described in the "Summary of the Invention" section are just one example for specifically explaining the form in which the present invention is embodied, and therefore, do not limit the elements of the present invention that are described in the "Summary of the Invention" section. In other words, the embodiment is nothing more than one specific example of the present invention that is described in the "Summary of the Invention" section, and interpretations of the present invention that is described in the "Summary of the Invention" section must be based on the description in that section.

The embodiment of the present invention have been explained above, but the present invention is not in any way limited by the embodiment that is described above, and various modifications may obviously be made within the scope of the present invention.

The present invention can be used in industries that manufacture power transmission devices and vehicles.

What is claimed is:
1. A power transmission device that is installed in a vehicle and that is connected to a power generation source that is capable of outputting power for driving, the power transmission device comprising:
  a belt-type continuously variable transmission that includes a first pulley provided on a drive side rotating shaft, a second pulley provided on a driven side rotating shaft, a belt that runs between the first pulley and the second pulley, a first fluid pressure cylinder that can vary a groove width in the first pulley, and a second fluid pressure cylinder that can vary a groove width in the second pulley, and that is capable of continuously varying power that is transmitted from the power generation source to the drive side rotating shaft by varying the groove widths in the first and the second pulleys using the first and the second fluid pressure cylinders and outputting the power to the driven side rotating shaft;
  a working fluid accumulation portion that accumulates a working fluid;
  a friction engagement element that is capable of transmitting the power from the power generation source to the drive side rotating shaft when the working fluid is supplied to the friction engagement element;
  a first pump that is driven by the power generation source and that is capable of taking in the working fluid from the working fluid accumulation portion and discharging the working fluid;

a pressure regulating valve that is capable of regulating the pressure of the working fluid from the first pump and outputting the working fluid to the first and the second fluid pressure cylinders;

a friction engagement element pressure regulating valve that is capable of regulating the pressure of the working fluid from the first pump side and outputting the working fluid to the friction engagement element side;

a second pump that is driven by electric power and that is capable of taking in the working fluid from the working fluid accumulation portion and discharging the working fluid; and a switching valve that is capable of supplying the working fluid from the friction engagement element pressure regulating valve to the friction engagement element when the working fluid is discharged from the first pump and that is capable of supplying the working fluid from the second pump to the friction engagement element when the working fluid is not discharged from the first pump.

2. The power transmission device according to claim 1, further comprising:

a manual valve that, in coordination with a shift lever for selecting a desired shift position from among a plurality of shift positions, is capable of switching a location to which the working fluid from the switching valve is supplied, in accordance with the shift position selected, wherein the friction engagement element is a forward friction engagement element and a reverse friction engagement element that are contained in a forward/reverse switching mechanism that is disposed between the power generation source and the belt-type continuously variable transmission, and the manual valve causes the working fluid from the switching valve to be supplied to the forward friction engagement element when a shift position for driving forward has been selected and causes the working fluid from the switching valve to be supplied to the reverse friction engagement element when a shift position for driving in reverse has been selected.

3. The power transmission device according to claim 1, wherein:

the second pump is capable of generating a fluid pressure that can put the friction engagement element into a state immediately prior to engagement.

4. The power transmission device according to claim 1, wherein:

the second pump is an electromagnetic pump.

5. The power transmission device according to claim 1, wherein:

the power generation source is an internal combustion engine that is controlled so as to automatically stop or start when a specified condition is satisfied.

6. The power transmission device according to claim 1, further comprising:

a second switching valve that allows the working fluid to flow out of the second fluid pressure cylinder when the working fluid is not discharged from the second pump and that restricts the flow of the working fluid out of the second fluid pressure cylinder when the working fluid is discharged from the second pump.

7. The power transmission device according to claim 6, wherein:

the second switching valve is configured so as to open when the working fluid is not discharged from the second pump and to be closed by the pressure of the working fluid from the second pump when the working fluid is discharged from the second pump.

8. The power transmission device according to claim 1, wherein:

the first fluid pressure cylinder includes a first external cylinder portion that, together with a movable sheave of the first pulley, forms a fluid pressure chamber, and a first sealing portion that is provided in a gap between the first external cylinder portion and the movable sheave, the second fluid pressure cylinder includes a second external cylinder portion that, together with a movable sheave of the second pulley, forms a fluid pressure chamber, and a second sealing portion that is provided in a gap between the second external cylinder portion and the movable sheave, and the first sealing portion has better sealing performance than does the second sealing portion.

* * * * *